United States Patent
Stepp et al.

(10) Patent No.: US 6,363,440 B1
(45) Date of Patent: Mar. 26, 2002

(54) METHOD AND APPARATUS FOR BUFFERING AN INCOMING INFORMATION SIGNAL FOR SUBSEQUENT RECORDING

(75) Inventors: George Thomas Stepp; Carrie A. Carlson, both of Sioux City, IA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/191,681

(22) Filed: Nov. 13, 1998

(51) Int. Cl.[7] .............................. G06F 3/00; H04N 5/45; H04N 5/14
(52) U.S. Cl. ............................ 710/52; 710/6; 710/25; 710/45; 348/731
(58) Field of Search ............................ 710/52, 45, 25, 710/6; 348/731

(56) References Cited

U.S. PATENT DOCUMENTS

| | | | |
|---|---|---|---|
| 5,734,444 A | * 3/1998 | Yoshinobu | 348/731 |
| 5,751,282 A | * 5/1998 | Girard et al. | 345/327 |
| 5,852,474 A | * 12/1998 | Nakagaki et al. | 348/564 |
| 5,974,218 A | * 10/1999 | Nagasaka et al. | 386/46 |
| 6,006,005 A | * 12/1999 | Okitsu | 386/46 |
| RE36,801 E | * 8/2000 | Logan et al. | 348/571 |

FOREIGN PATENT DOCUMENTS

DE    04408131    * 7/1995

* cited by examiner

*Primary Examiner*—Thomas Lee
*Assistant Examiner*—Tammara Peyton
(74) *Attorney, Agent, or Firm*—Kenneth J. Cool; Walter j. Malinowski; Suiter & Associates

(57) ABSTRACT

A method and system for storing an information signal for subsequent recording are disclosed. An incoming information signal is received, and a starting point in the information signal is identified. At least a portion of the information signal is stored in a memory as it is received, including the identified starting point. A command to record the information signal is received subsequent to the starting point of the information signal, and the information signal is recorded from the memory beginning with the starting point such that the information signal is recorded in its entirety. If the information signal is not recorded, the information signal will continue to be saved until the capacity of the memory is reached at which point the information signal may be recorded over the previously saved information signal. An end point of an information signal may be identified as the starting point of a new information signal desired to be recorded.

42 Claims, 3 Drawing Sheets

METHOD AND APPARATUS FOR BUFFERING AN INCOMING INFORMATION SIGNAL FOR SUBSEQUENT RECORDING

FIELD OF THE INVENTION

The present invention relates generally to the field of information handling systems, and particularly to an information handling system for recording information.

BACKGROUND OF THE INVENTION

Traditional broadcast media formats entail broadcasting information programs at regularly scheduled intervals such as every hour or one-half hour. Thus, a broadcast such as a television program normally begins on the top of every hour. However, it is often the situation that a viewer will not arrive on time to view the beginning of a broadcast. Also, viewers tend to change channels frequently until a desired program is discovered, but only after a portion of the program has already been broadcast. If a user decides in the middle of a program that recording of the program is desirable, the beginning portions of the program will be lost, and an incomplete recording of the program will be made. It would be highly desirable to provide a system and method for recording a program in its entirety from the beginning even though the decision to record the program occurs after the program starts and has been broadcast for a non-zero duration.

SUMMARY OF THE INVENTION

The present invention is directed to a method for storing an information signal for subsequent recording. In one embodiment, the method includes steps for receiving an incoming information signal, identifying a starting point in the information signal, storing at least a portion of the information signal in a memory as it is received including the identified starting point, receiving a command to record the information signal, the recording command occurring subsequent to the starting point of the information signal, and recording the information signal from the memory beginning with the starting point of the information signal such that the information signal may be recorded in entirety.

The present invention is further directed to an information handling system for storing an information signal for subsequent recording. In one embodiment, the information handling system includes a processor for executing a program of instructions on the information handling system, a memory, coupled to the processor, for storing the program of instructions, a receiver for receiving the information signal from a start time, a buffer operatively coupled to the receiver for storing at least a portion of the information signal, the processor identifying a start portion of the information signal corresponding to the start time, a recording storage device for recording the information signal, and a recording control interface coupled to the information handling system for receiving a recording input command causing the recording storage device to start recording from the buffer beginning from the start portion of the information signal subsequent to the start time.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
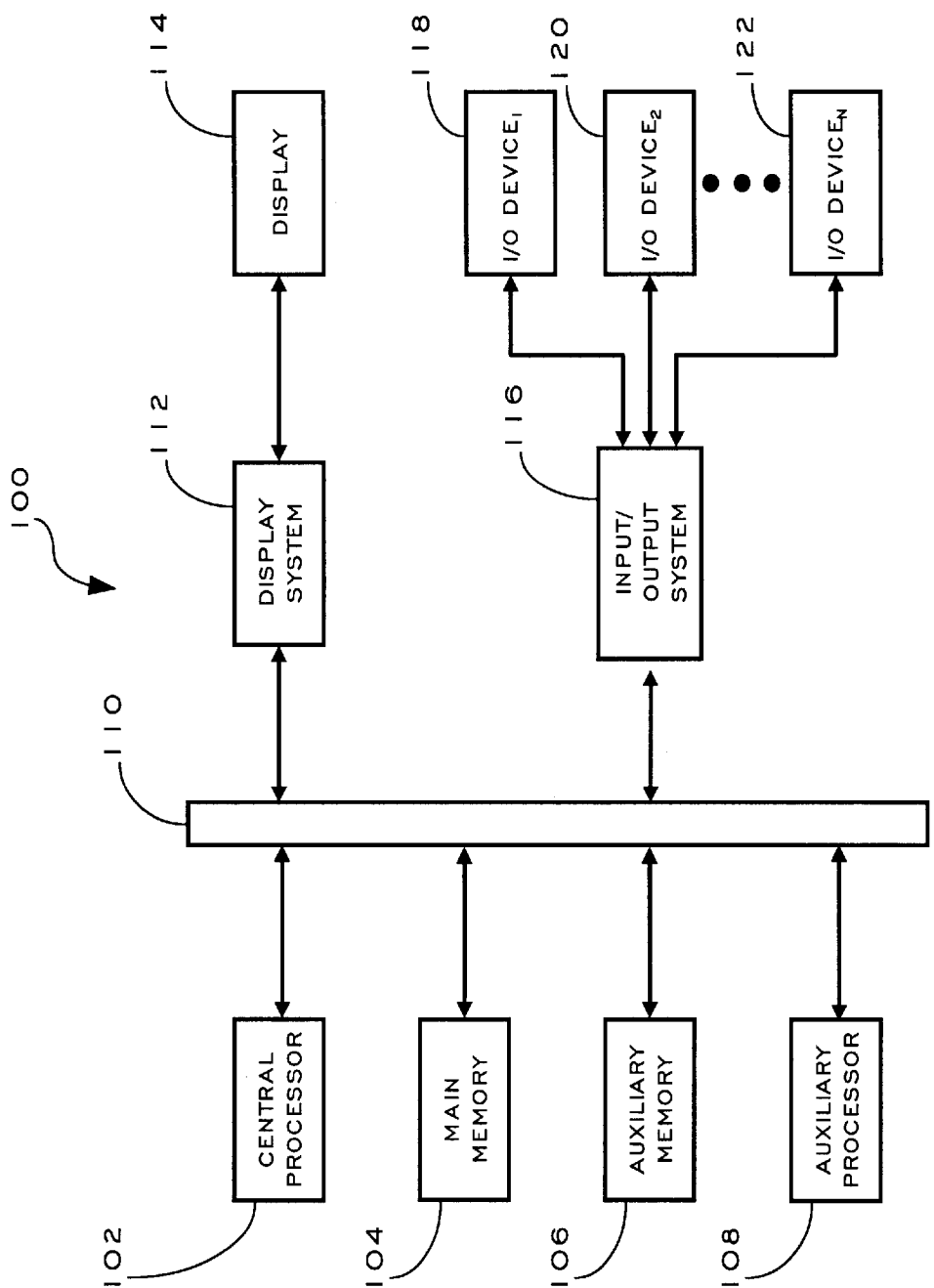
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 100 may be compliant with any promulgated industry standard. For example, bus 100 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc readonly memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
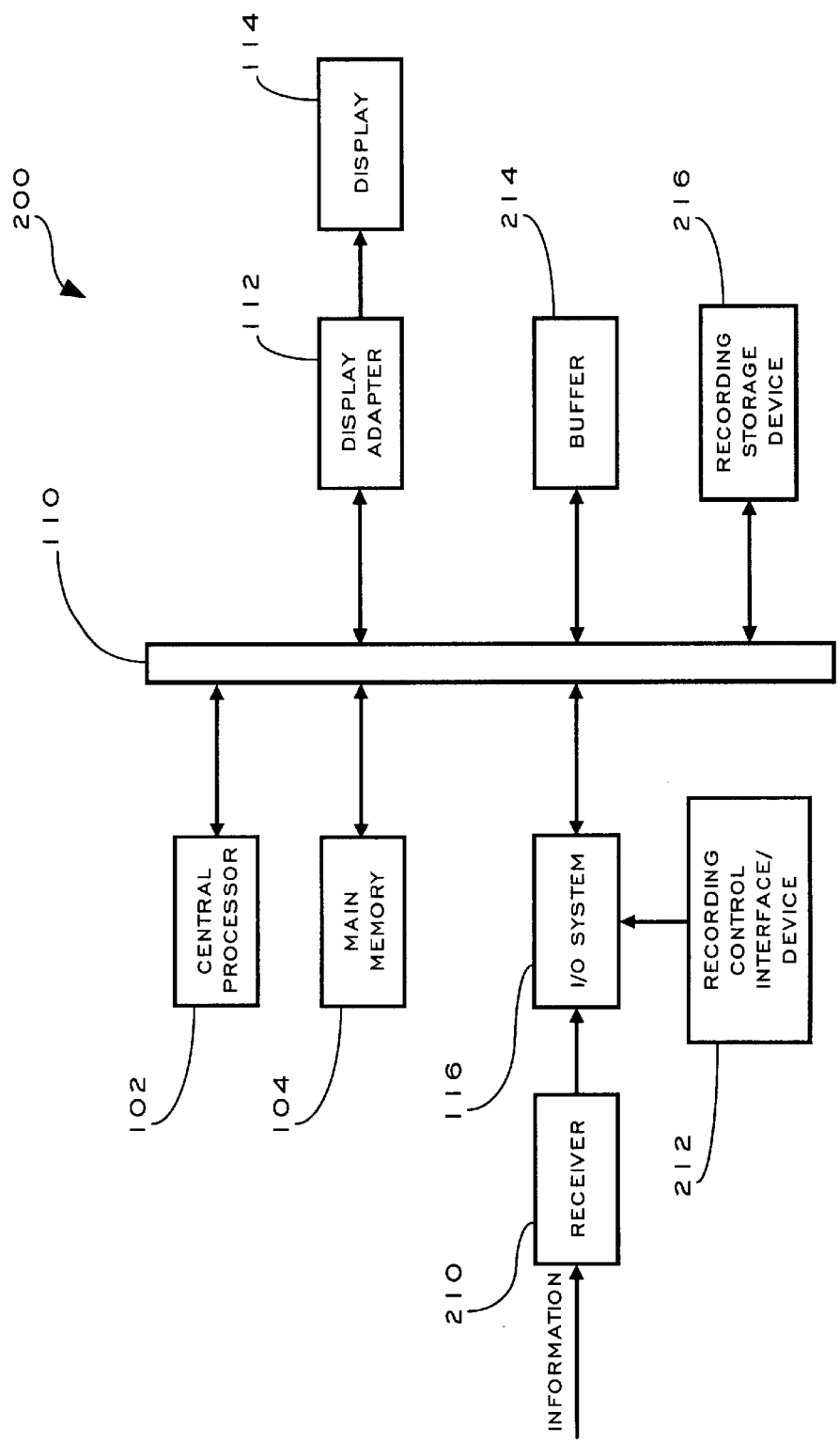
FIG. 2 is a block diagram of a system for buffering an incoming information signal in accordance with the present invention.

Referring now to FIG. 2, a block diagram of a system for buffering an incoming information signal in accordance with the present invention will be discussed. The buffering system 200 is analogous to information handling system of FIG. 1 being configured to perform buffering and recording of an information signal such as a video or television signal. An information signal ("INFORMATION") is received by a receiver 210. Receiver 210 is configured to receive an information signal such as a broadcast video signal transmitted over a television, cable, or satellite network. Receiver 210 may be any circuit for intercepting an information signal, processing the information signal, and converting the signal as an output to a form interpretable by an information handling system such as buffering system 200. The output signal from receiver 210 is received by I/O system 116 of buffering system 200 and provides the signal to bus 110. The information signal is then sent to a buffer storage location or memory 214 for saving the incoming information signal as it is received by buffering system 200. A recording control interface and/or device 212 provides input commands to buffering system 200 via I/O system 116. When an operator provides a record command with recording control device 212 to I/O system 116, recording storage device 216 begins recording the information signal from buffer 216. After the information signal is recorded, the information may be displayed on display 114 via display adapter 112 by reproduction (i.e. play back) of the information signal from recording device 216. Central processor 102 executes a program of instructions stored in main memory 104 for controlling the receiving, buffering, recording, and reproduction of the information signal.

An information signal may include information regarding the content of the information signal. For example, the time at which the information signal is initially broadcast (i.e. the start time) may be encoded into the information signal. Other information such as the length of the information signal, broadcast start time, title, etc. may also be encoded along with information signal itself. The encoded information may be determined by receiver 210 by implementing appropriate decoding techniques such that the encoded information may be determined. The encoded information may then be stored in buffer 214 along with the information signal such that the start time of the information signal may be determined. As the information signal is received by buffering system 200 and stored in buffer 214, a portion of the information signal is saved in buffer 214 that is capable of being accessed at a time later than the actual start time at which the information signal was originally broadcast. The magnitude of the duration of the information signal capable of being stored in buffer is generally proportional to the size of buffer 214. The greater the size of buffer 214, the greater the length of time of information signal that may be saved, and the later in time after the start time recording apparatus 216 is capable of recording information signal from its beginning (i.e. start time). However, the amount of information capable of being stored in buffer 214 may be effectively increased by compressing the information signal prior to storage of the information in buffer 214. Standard video compression algorithms may be employed by processor 102 on the information signal such as a Motion Pictures Expert Group (MPEG) standard (e.g., MPEG-1, MPEG-2, MPEG-3, MPEG-4, etc.) Thus, the length of time of information signal storable in buffer 214 may be increased by through compression routines. Buffer 214 may comprise buffer-pooling architecture utilizing a number of buffer storage locations or a circular buffer that is managed as a queue. Data may be transferred into and out of buffer 214 on a first in, first out basis (FIFO). Buffer 214 may comprise an auxiliary memory device such as auxiliary memory device 108 of information handling system 100 of FIG. 1. Thus, buffer may be any various type of random access memory (RAM) such as DRAM, SRAM, hard disk drive, etc. Similarly, recording storage device 216 may also be any various type of auxiliary memory 108 including a hard disk drive. Recording storage device may include a magnetic tape storage system such as a video cassette recorder (VCR).

Figure 3:
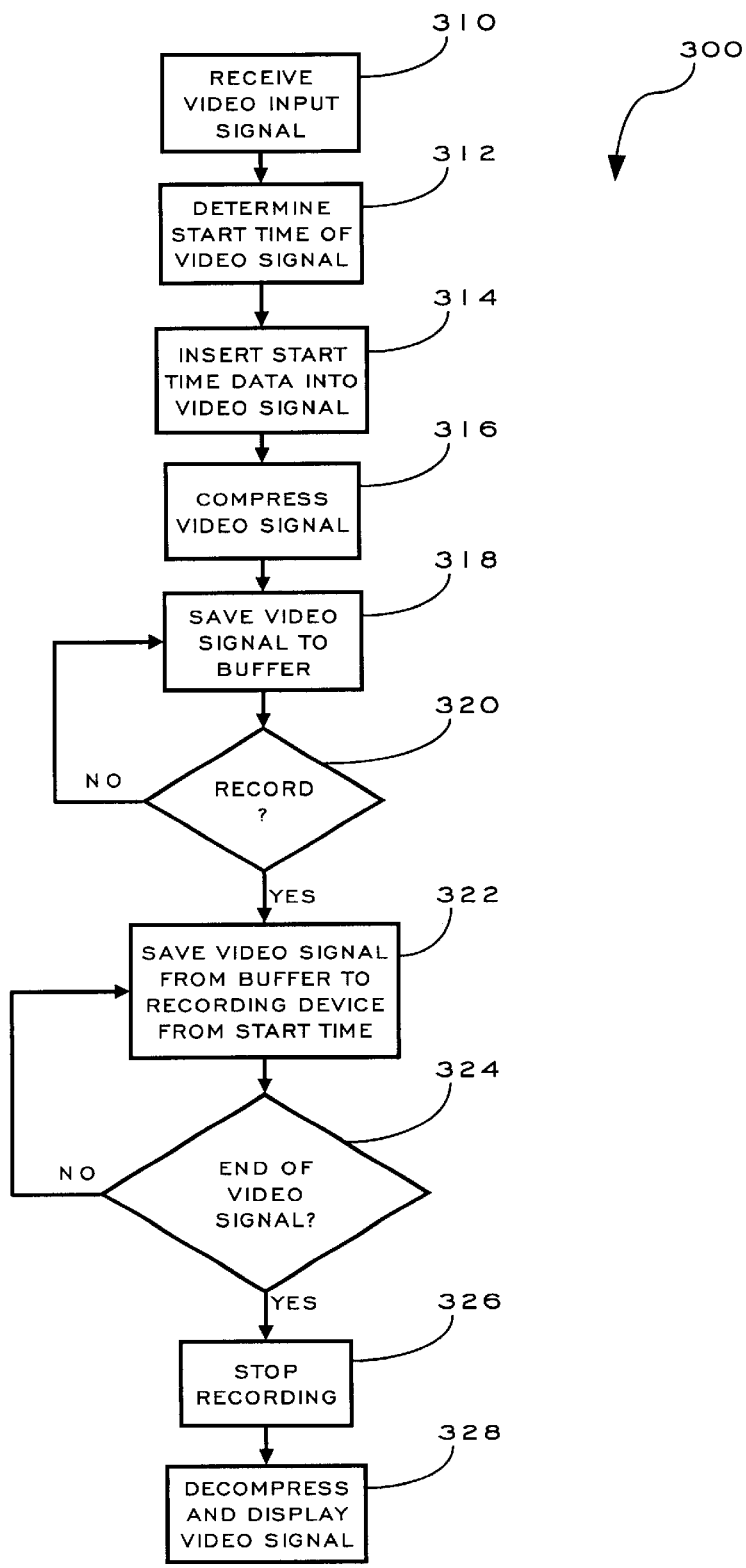
FIG. 3 is a flow diagram of a method for buffering an information signal for later recording in accordance with the present invention.

Referring now to FIG. 3, a method for buffering an information signal for later recording will be discussed. The method 300 initiates with the receiving of an information signal such as a video signal at step 310 with receiver 210. The start time of the information signal is determined at step 312, and the start time data is inserted into the video signal at step 314. Thus, the start of the information signal is tagged such that the beginning of the information signal is known. The information signal may thereby be accessed at a subsequent time from the beginning by identifying the start time data in the video signal. The video signal may be compressed at step 316 in order to increase the effective capacity of buffer 214 whereby the length of the video signal stored therein is increased. The video signal is then saved at step 318 in buffer 214 for later retrieval. A determination is made at step 320 whether recording of the information signal is desired. If recording is not desired, the incoming video signal is continued to be saved in buffer 214 until an affirmative decision to record the video signal is made. If the information signal is not recorded, the information signal will continue to be saved until the capacity of the memory is reached at which point the information signal may be recorded over the previously saved information signal. In the event that recording of the video signal is desired, the video signal may be recorded at step 322 from buffer 214 to recording storage device 216 from the start or beginning of the information signal. Under this arrangement, the decision to record the information signal (step 320) may be delayed for a duration after the start time at which the information signal was received at step 310. For example, a user may come upon a particular video program twenty minutes after the program has begun at which time the user desires to record the program. Since the video program has been stored in buffer 214 from the start of the program, recording storage device 216 may record the program from the beginning by recording the program from the buffer 214 beginning from the start time of the program. A determination may be made at step 324 whether an endpoint of the video signal is reached. An end point of an information signal may be identified as the starting point of a new information signal desired to be recorded. In the event an endpoint of the video signal is not reached, recording storage device continues to record the video signal from buffer 214 at step 322. For instance, in the event the endpoint of the information signal is an undesired break in the information signal, storage (buffering) and recording of the information signal may be ceased during the undesired break. Storage (buffering) and recording may then be resumed upon completion of the undesired break. In the event an endpoint in the video signal is reached, recording storage device 216 stops recording the video signal at step 326. The video signal in its entirety is then stored on recording storage device 216 for later viewing by a user of buffering system 200. At an appropriate time, the user may view the video signal by decompressing the video signal (if previously compressed) and displaying the video signal on display 114 from recording storage device 216 at step 328.

Although the invention has been described with a certain degree of particularity, it should be recognized. that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a combination magnetic and optical disk for utilization in a combination magnetic and optical disk drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for buffering an incoming information signal for subsequent recording of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for storing an information signal for subsequent recording, comprising:
   receiving an incoming information signal;
   identifying a starting point in the information signal;
   storing at least a portion of the information signal in a memory as it is received including the identified starting point;
   receiving a command to record the information signal, the recording command occurring subsequent to the starting point of the information signal; and
   recording the information signal from the memory beginning with the starting point of the information signal such that the information signal may be recorded in entirety.

2. A method as claimed in claim 1, further comprising the step of compressing the incoming information signal before storing the information signal to the memory thereby increasing the portion of the information signal stored in the memory.

3. A method as claimed in claim 2, further comprising the step of decompressing the recorded information signal and then reproducing the information signal.

4. A method as claimed in claim 1, further comprising the step of determining whether an endpoint of the information signal is reached, and, in the event an endpoint of the information signal is reached, terminating recording of the information signal.

5. A method as claimed in claim 4, further comprising, in the event the endpoint of the information signal is an undesired break in the information signal, ceasing said storing and said recording steps during the undesired break and then resuming said buffering and said storing steps upon completion of the undesired break.

6. A method as claimed in claim 1, wherein said storing step includes the step of buffering the information signal to an information storage medium.

7. A method as claimed in claim 1, wherein said recording step includes the step of recording the information signal to an information storage medium.

8. A program of instructions storable on an medium readable by an information handling system for causing the information handling system to execute steps for storing an information signal for subsequent recording, the steps comprising:

receiving an incoming information signal;

identifying a starting point in the information signal;

storing at least a portion of the information signal in a memory as it is received including the identified starting point;

receiving a command to record the information signal, the recording command occurring subsequent to the starting point of the information signal; and recording the information signal from the memory beginning with the starting point of the information signal such that the information signal may be recorded in entirety.

9. A program of instructions as claimed in claim 8, further comprising the step of compressing the incoming information signal before storing the information signal to the memory thereby increasing the portion of the information signal stored in the memory.

10. A program of instructions as claimed in claim 9, further comprising the step of decompressing the recorded information signal and then reproducing the information signal.

11. A program of instructions as claimed in claim 8, further comprising the step of determining whether an endpoint of the information signal is reached, and, in the event an endpoint of the information signal is reached, terminating recording of the information signal.

12. A program of instructions as claimed in claim 11, further comprising, in the event the endpoint of the information signal is an undesired break in the information signal, ceasing said storing and said recording steps during the undesired break and then resuming said buffering and said storing steps upon completion of the undesired break.

13. A program of instructions as claimed in claim 8, wherein said storing step includes the step of buffering the information signal to an information storage medium.

14. A program of instructions as claimed in claim 8, wherein said recording step includes the step of recording the information signal to an information storage medium.

15. An information handling system for storing an information signal for subsequent recording, comprising:

a processor for executing a program of instructions on the information handling system;

a memory, coupled to said processor, for storing the program of instructions;

a receiver for receiving the information signal from a start time;

a buffer operatively coupled to said receiver for storing at least a portion of the information signal, said processor identifying a start portion of the information signal corresponding to the start time;

a recording storage device for recording the information signal; and a recording control interface coupled to the information handling system for receiving a recording input command subsequent to the start time, causing said recording storage device to start recording from said buffer beginning from the start portion of the information signal.

16. An information handling system as claimed in claim 15, said recording control interface including a recording control device.

17. An information handling system as claimed in claim 15, said buffer comprising a hard disk drive of the information handling system.

18. An information handling system as claimed in claim 15, said recording storage device including a hard disk drive of the information handling system.

19. An information handling system as claimed in claim 15, said information signal being a video signal.

20. An information handling system as claimed in claim 15, the program of instructions executed by said processor causing said processor to compress the information signal stored by said buffer.

21. An information handling system for storing an information signal for subsequent recording, comprising:

means for executing a program of instructions on the information handling system;

means, coupled to said executing means, for storing the program of instructions;

means for receiver the information signal from a start time;

means, operatively coupled to said receiving means, for storing at least a portion of the information signal, said executing means identifying a start portion of the information signal corresponding to the start time;

means for recording the information signal; and means, coupled to the information handling system, for receiving a recording input command, subsequent to the start time, causing said recording means to start recording from said information signal storage means beginning from the start portion of the information signal.

22. An information handling system as claimed in claim 21, said recording means including a means for providing a control input to the information handling system.

23. An information handling system as claimed in claim 21, said information signal storing means comprising a hard disk drive of the information handling system.

24. An information handling system as claimed in claim 21, said recording means including a hard disk drive of the information handling system.

25. An information handling system as claimed in claim 21, said information signal being a video signal.

26. An information handling system as claimed in claim 21, the program of instructions executed by said executing means causing said executing means to compress the information signal stored by said information signal storing means.

27. A method as claimed in claim 1, wherein said step of receiving an incoming information signal comprises receiving a streaming digital signal.

28. A method as claimed in claim 27, wherein the streaming digital signal is streamed over the Internet.

29. A method as claimed in claim 1, wherein the memory is integrated in a recording device for recording the information signal.

30. A method as claimed in claim 29, wherein said step of recording the information signal comprises recording the information signal to the memory.

31. A method as claimed in claim 1, wherein the memory is remote from a recording device for recording the information signal.

32. A method as claimed in claim 31, wherein the recording device for recording the information signal includes a second memory suitable for recording of the information signal.

33. A program of instructions as claimed in claim 8, wherein said step of receiving an incoming information signal comprises receiving a streaming digital signal.

34. A program of instructions as claimed in claim 33, wherein the streaming digital signal is streamed over the Internet.

35. A program of instructions as claimed in claim 8, wherein the memory is integrated in a recording device for recording the information signal.

36. A program of instructions as claimed in claim 35, wherein said step of recording the information signal comprises recording the information signal to the memory.

37. A program of instructions as claimed in claim 8, wherein the memory is remote from a recording device for recording the information signal.

38. A program of instructions as claimed in claim 37, wherein the recording device for recording the information signal includes a second memory suitable for recording of the information signal.

39. An information handling system as claimed in claim 15, said information signal being a streaming digital signal.

40. An information handling system as claimed in claim 39, wherein the streaming digital signal is streamed over the Internet.

41. An information handling system as claimed in claim 21, said information signal being a streaming digital signal.

42. An information handling system as claimed in claim 41, wherein the streaming digital signal is streamed over the Internet.

* * * * *